US011713053B2

United States Patent
Fujii et al.

(10) Patent No.: US 11,713,053 B2
(45) Date of Patent: Aug. 1, 2023

(54) VEHICLE, INFORMATION PROCESSING SYSTEM, NON-TRANSITORY COMPUTER READABLE MEDIUM, AND CONTROL METHOD

(71) Applicant: TOYOTA JIDOSHA KABUSHIKI KAISHA, Toyota (JP)

(72) Inventors: Hiromitsu Fujii, Kariya (JP); Kohei Miwa, Nisshin (JP); Yuko Mizuno, Nagoya (JP); Shinsuke Ariga, Nagoya (JP); Hirotaka Omisha, Nisshin (JP); Tsuyoshi Okada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 204 days.

(21) Appl. No.: 17/060,344

(22) Filed: Oct. 1, 2020

(65) Prior Publication Data
US 2021/0101608 A1 Apr. 8, 2021

(30) Foreign Application Priority Data
Oct. 8, 2019 (JP) ................................ 2019-185452

(51) Int. Cl.
| B60W 50/10 | (2012.01) |
| B60R 11/02 | (2006.01) |
| B60R 11/04 | (2006.01) |
| B60W 60/00 | (2020.01) |
| B60R 11/00 | (2006.01) |

(52) U.S. Cl.
CPC ......... *B60W 50/10* (2013.01); *B60R 11/0229* (2013.01); *B60R 11/04* (2013.01); *B60W 60/001* (2020.02); *B60W 60/00139* (2020.02); *B60R 2011/0019* (2013.01); *B60W 2540/215* (2020.02); *B60W 2540/22* (2013.01)

(58) Field of Classification Search
CPC ............... B60W 50/10; B60W 60/001; B60W 2540/215; B60W 2540/22; B60W 60/00139; B60R 11/0229; B60R 11/04; B60R 2011/0019; B60R 1/00; G06F 3/011; G06F 16/9035; G06F 16/904; G06Q 50/14
See application file for complete search history.

(56) References Cited

U.S. PATENT DOCUMENTS

| 2010/0023544 A1* | 1/2010 | Shahraray | G11B 27/105 707/E17.009 |
| 2013/0006515 A1* | 1/2013 | Vellaikal | G06Q 30/0266 701/410 |
| 2017/0021282 A1* | 1/2017 | Comploi | G05D 1/0088 |
| 2018/0089901 A1* | 3/2018 | Rober | G06F 3/016 |

(Continued)

FOREIGN PATENT DOCUMENTS

| JP | 2003187383 A | 7/2003 |
| JP | 2009-258026 A | 11/2009 |

(Continued)

*Primary Examiner* — Nadeem Odeh
(74) *Attorney, Agent, or Firm* — Oliff PLC

(57) ABSTRACT

A vehicle includes a controller and a display. The display is mounted in the vehicle to surround a user in the vehicle. The controller is configured to determine travel information to be proposed to the user based on attribute information for the user, and present the determined travel information on the display.

9 Claims, 9 Drawing Sheets

| TRAVEL PLAN ID | TARGET AGE | TARGET GENDER | ACCOMPANYING PERSON | DESTINATION | PURPOSE | VIDEO PLAYBACK TIME PERIOD | PRESENCE OR ABSENCE OF DIGEST VERSION | CONTROL DETAILS |
|---|---|---|---|---|---|---|---|---|
| P001 | 20-29 YEARS OLD | MALE | FRIEND | TOKYO | SHOPPING, FOOD | 15 MIN. | PRESENT | SOUND OF CROWD |
| P002 | 20-49 YEARS OLD | FEMALE | FRIEND | OKINAWA | SEA BATHING | 20 MIN. | ABSENT | 32°C, WAVE SOUND |
| P003 | 30-49 YEARS OLD | MALE, FEMALE | CHILD | HOKKAIDO | HIKING, FOOD | 15 MIN. | PRESENT | BIRD SONG |
| P004 | 50-70 YEARS OLD | MALE, FEMALE | SPOUSE | OSAKA | FOOD | 30 MIN. | ABSENT | SMELL OF OCTOPUS DUMPLINGS |
| ⋮ | ⋮ | ⋮ | ⋮ | ⋮ | ⋮ | ⋮ | ⋮ | ⋮ |

(56) References Cited

U.S. PATENT DOCUMENTS

| | | | |
|---|---|---|---|
| 2019/0019329 A1* | 1/2019 | Eyler | G06F 3/011 |
| 2019/0124301 A1* | 4/2019 | Yoshii | H04N 7/183 |
| 2019/0184919 A1* | 6/2019 | Kamini | B60H 1/00985 |
| 2019/0289264 A1* | 9/2019 | Hachisuka | H04N 5/272 |
| 2020/0026279 A1* | 1/2020 | Rhodes | G01C 21/3476 |
| 2020/0064142 A1* | 2/2020 | Choi | G01C 21/3407 |
| 2020/0312282 A1* | 10/2020 | Akagawa | G09G 5/377 |
| 2020/0329342 A1* | 10/2020 | Beaurepaire | G06F 9/451 |
| 2022/0092138 A1* | 3/2022 | Price | G06Q 30/0203 |

FOREIGN PATENT DOCUMENTS

| | | |
|---|---|---|
| JP | 2011133230 A | 7/2011 |
| JP | 2018105750 A | 7/2018 |
| WO | 2017208718 A1 | 12/2017 |

* cited by examiner

A-A' SECTIONAL VIEW

*FIG. 6*

| USER ID | AGE | GENDER | HOBBIES AND PREFERENCES |
|---------|-----|--------|-------------------------|
| U001 | 30 | MALE | FOOD |
| ⋮ | ⋮ | ⋮ | ⋮ |

FIG. 7

| TRAVEL PLAN ID | TARGET AGE | TARGET GENDER | ACCOMPANYING PERSON | DESTINATION | PURPOSE | VIDEO PLAYBACK TIME PERIOD | PRESENCE OR ABSENCE OF DIGEST VERSION | CONTROL DETAILS |
|---|---|---|---|---|---|---|---|---|
| P001 | 20-29 YEARS OLD | MALE | FRIEND | TOKYO | SHOPPING, FOOD | 15 MIN. | PRESENT | SOUND OF CROWD |
| P002 | 20-49 YEARS OLD | FEMALE | FRIEND | OKINAWA | SEA BATHING | 20 MIN. | ABSENT | 32°C, WAVE SOUND |
| P003 | 30-49 YEARS OLD | MALE, FEMALE | CHILD | HOKKAIDO | HIKING, FOOD | 15 MIN. | PRESENT | BIRD SONG |
| P004 | 50-70 YEARS OLD | MALE, FEMALE | SPOUSE | OSAKA | FOOD | 30 MIN. | ABSENT | SMELL OF OCTOPUS DUMPLINGS |
| ... | ... | ... | ... | ... | ... | ... | ... | ... |

FIG. 8

| USER ID | DATE AND TIME | EVENT |
|---------|---------------|-------|
| U001 | SEPTEMBER 1, 2019 FROM 09:00 TO 18:00 | WORK |
| U001 | SEPTEMBER 01, 2019 FROM 19:00 TO 22:00 | DINNER |
| ⋮ | ⋮ | ⋮ |

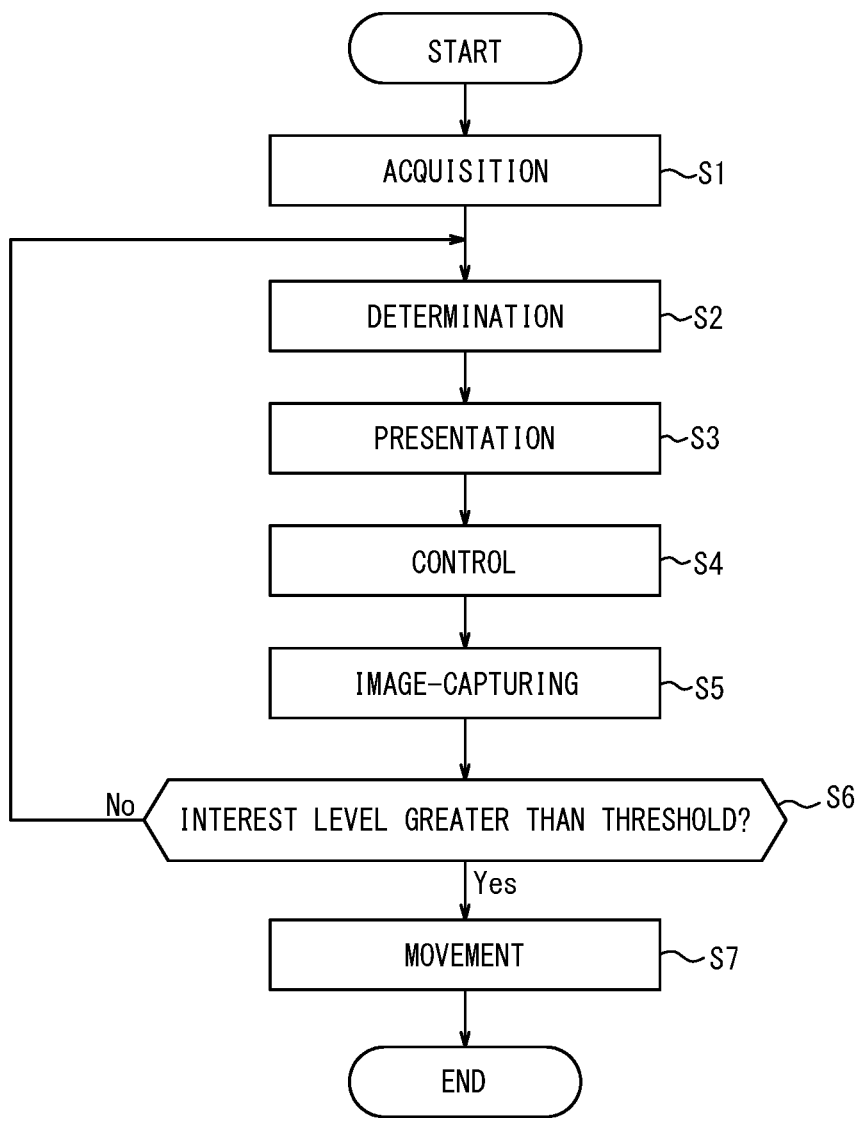

VEHICLE, INFORMATION PROCESSING SYSTEM, NON-TRANSITORY COMPUTER READABLE MEDIUM, AND CONTROL METHOD

CROSS-REFERENCE TO RELATED APPLICATION

This application claims priority to Japanese Patent Application No. 2019-185452 (filed on Oct. 8, 2019), the entire contents of which are incorporated herein by reference.

TECHNICAL FIELD

The present disclosure relates to a vehicle, an information processing system, a program, and a control method.

BACKGROUND

Navigation apparatuses that propose a travel plan, provide route guidance when the proposed travel plan is selected by a driver, and receive a satisfaction rating from a user after completion of the route guidance are known (for example, Patent Literature [PTL] 1).

CITATION LIST

Patent Literature

PTL 1: JP 2009-258026 A

SUMMARY

In the above PTL 1, travel plans with higher satisfaction ratings are preferentially proposed to the user. However, this method fails to provide an effective proposal that creates an immersive sensation. This method therefore has room for improvement.

It would therefore be helpful to provide a vehicle, an information processing system, a program, and a control method that are capable of providing an effective proposal of travel information that creates an immersive sensation.

A vehicle according to an embodiment of the present disclosure includes:
a controller; and
a display, wherein
the display is mounted in the vehicle to surround a user in the vehicle, and
the controller is configured to determine travel information to be proposed to the user based on attribute information for the user, and present the determined travel information on the display.

A program according to an embodiment of the present disclosure is configured to cause a computer in a vehicle to execute operations. The vehicle includes a display mounted in the vehicle to surround a user in the vehicle. The operations include:
determining travel information to be proposed to the user based on attribute information for the user; and
presenting the determined travel information on the display.

A control method according to an embodiment of the present disclosure is used by a vehicle including a display mounted in the vehicle to surround a user in the vehicle. The control method includes:
determining travel information to be proposed to the user based on attribute information for the user; and
presenting the determined travel information on the display.

A vehicle, an information processing system, a program, and a control method according to an embodiment of the present disclosure may provide an effective proposal of travel information that creates an immersive sensation.

BRIEF DESCRIPTION OF THE DRAWINGS

In the accompanying drawings:
FIG. 6 illustrates a configuration of an attribute information DB;
FIG. 7 illustrates a configuration of a travel plan DB;
FIG. 8 illustrates a configuration of a schedule DB;
and
FIG. 9 is a flowchart illustrating operations of the vehicle.

DETAILED DESCRIPTION

Figure 1:
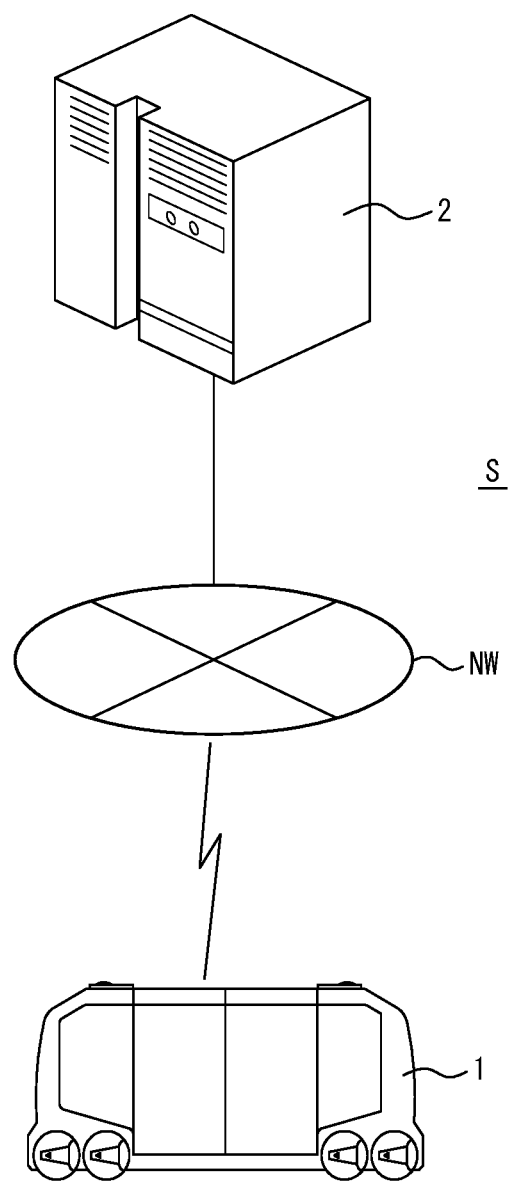
FIG. 1 is a schematic diagram of an information processing system.

FIG. 1 is a schematic diagram of an information processing system S according to an embodiment. The information processing system S includes a vehicle 1 and a server 2, which are connectable to each other. In FIG. 1, a single vehicle 1 and a single server 2 are illustrated for convenience of explanation. However, the number of vehicles 1 and the number of servers 2 are not limited to one. The vehicle 1 and the server 2 are capable of communicating with each other, for example, via a network NW which includes a mobile communication network, the Internet, or the like.

The vehicle 1 is any vehicle, such as an on-demand bus, a rental car, a shared car, or a taxi, that a user boards. The vehicle 1 may be driven by a driver. In the present embodiment, as an example, the vehicle 1 is driven by autonomous driving with a user on board. The driving of the vehicle 1 may be automated at any level. The automation level is, for example, one of Level 1 to Level 5 according to the classification of the Society of Automotive Engineers (SAE). The vehicle 1 can provide any type of mobility services.

Figure 2:
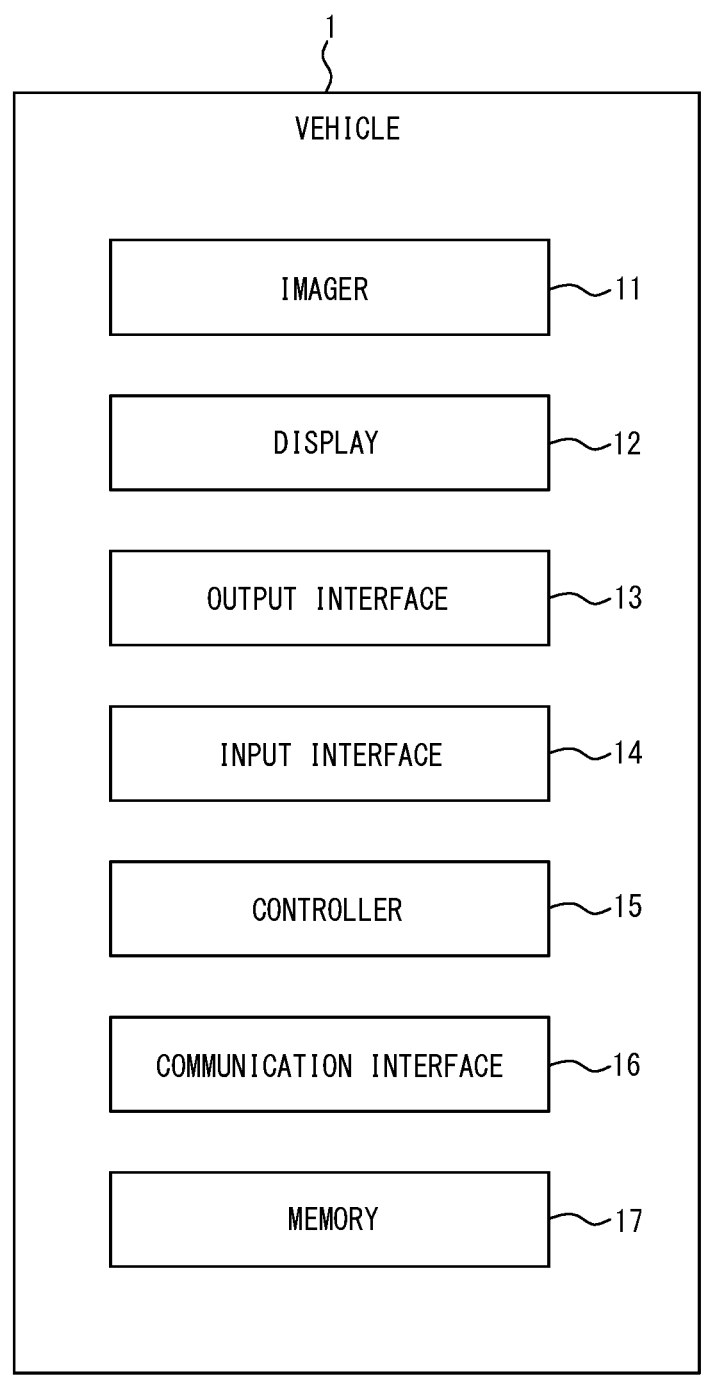
FIG. 2 is a function block diagram of a vehicle.

A description is given of an outline of processing that is executed by the vehicle 1 according to the present embodiment. As illustrated in FIG. 2, the vehicle 1 includes a display 12. In the vehicle 1, the display 12 is mounted to surround a user U who is on board the vehicle 1. The user U may view a still image or a video presented on the display 12. A controller 15 is configured to determine travel information to be proposed to the user U based on attribute information for the user U. The travel information may include any type of information, such as a travel plan indicating a schedule, or a scenery image of a destination of a travel plan. The controller 15 is configured to present the determined travel information on the display 12. Thus, according to the present embodiment, the display 12 is mounted to surround the user U who is on board the vehicle 1, and is configured to present the travel information. When proposing the travel information, the vehicle 1 with the above configuration can provide an immersive sensation to the user U and, accordingly, can effectively propose the travel information.

With reference to FIG. 2, an internal configuration of the vehicle 1 is described in detail.

The vehicle 1 includes an imager 11, the display 12, an output interface 13, an input interface 14, the controller 15, a communication interface 16, and a memory 17. These functional parts are communicably connected to each other, for example, via an in-vehicle network, such as a Controller Area Network (CAN), or a dedicated line.

The imager 11 includes a so-called in-vehicle camera and is configured to capture an image of, for example, the user U. The imager 11 may store the captured image in the memory 17 or transmit the captured image to the controller 15 for the purpose of analysis.

The display 12 includes a display interface, such as a panel display, that is configured to present, to the user U, information generated by the controller 15, information read out of the memory 17, or the like. The user U may view such information presented on the display 12.

The output interface 13 is an interface configured to be controlled by the controller 15 according to vehicle control information. The output interface 13 is configured to output cold or warm air for room temperature adjustment, vibration, sound, or smell, etc.

The input interface 14 includes one or more input interfaces that detect a user input and send input information to the controller 15. Examples of input interfaces may include, but are not limited to, a physical key, a capacitive key, a touch screen integrally provided in the panel display, a microphone configured to receive audio input, and an IC card reader.

The controller 15 includes, for example, one or more general-purpose processors, such as a Central Processing Unit (CPU) or a Micro Processing Unit (MPU), or one or more dedicated processors that are dedicated to specific processing. The controller 15 is not limited to processors and may include one or more dedicated circuits. Examples of dedicated circuits may include a Field-Programmable Gate Array (FPGA) and an Application Specific Integrated Circuit (ASIC). The controller 15 may be an Electronic Control Unit (ECU). The controller 15 is not limited to an ECU and may be any in-vehicle apparatus, such as a car navigation apparatus.

The communication interface 16 includes one or more communication modules for connection to the network NW that conform to wired or wireless LAN standards. The communication interface 16 may include a communication module conforming to wired or wireless LAN standards, or a module conforming to mobile communication standards, such as the 4th Generation (4G) or the 5th Generation (5G) standards. The communication interface 16 may include a communication module conforming to near field communications, such as Bluetooth® (Bluetooth is a registered trademark in Japan, other countries, or both), AirDrop® (AirDrop is a registered trademark in Japan, other countries, or both), IrDA, ZigBee® (ZigBee is a registered trademark in Japan, other countries, or both), Felica® (Felica is a registered trademark in Japan, other countries, or both), or RFID. An in-vehicle communication apparatus may function as the communication interface 16. In the present embodiment, the vehicle 1 is connected to the network NW via the communication interface 16. The communication interface 16 is configured to transmit and receive any information via the network NW.

The memory 17 may be, but is not limited to, a semiconductor memory, a magnetic memory, or an optical memory. The memory 17 may function as, for example, a main memory, an auxiliary memory, or a cache memory. The memory 17 may store information resulting from analysis or processing performed by the controller 15. The memory 17 may store various types of information (e.g., an image acquired from the server 2) regarding operations and control of the vehicle 1. The memory 17 may store a system program, an application program, embedded software, etc. For example, the memory 17 in the present embodiment includes an attribute information database (DB) and a travel plan DB. The attribute information DB contains attribute information for the user U. The travel plan DB contains details of travel plans.

Figure 3:
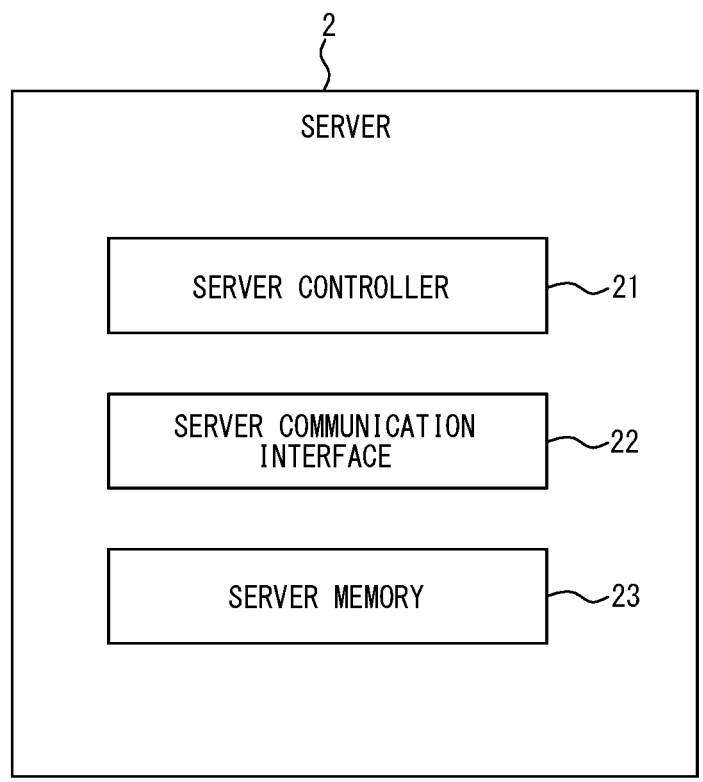
FIG. 3 is a function block diagram of a server.

With reference to FIG. 3, an internal configuration of the server 2 is described in detail.

The server 2 includes a server controller 21, a server communication interface 22, and a server memory 23. These functional parts are communicably connected to each other.

The server controller 21 includes, for example, one or more general-purpose processors, such as a Central Processing Unit (CPU) or a Micro Processing Unit (MPU), or one or more dedicated processors that are dedicated to specific processing. The server controller 21 is not limited to processors and may include one or more dedicated circuits. Examples of dedicated circuits may include a Field-Programmable Gate Array (FPGA) and an Application Specific Integrated Circuit (ASIC).

The server communication interface 22 includes one or more communication modules for connection to the network NW that conform to wired or wireless LAN standards. The server communication interface 22 may include a communication module conforming to wired or wireless LAN standards, or a module conforming to mobile communication standards, such as the 4th Generation (4G) or the 5th Generation (5G) standards. The server communication interface 22 may include a communication module conforming to near field communications, such as Bluetooth®, AirDrop®, IrDA, ZigBee®, Felica®, or RFID. In the present embodiment, the server 2 is connected to the network NW via the server communication interface 22. The server communication interface 22 is configured to transmit and receive any information via the network NW.

The server memory 23 may be, but is not limited to, a semiconductor memory, a magnetic memory, or an optical memory. The server memory 23 may function as, for example, a main memory, an auxiliary memory, or a cache memory. The server memory 23 may store information resulting from analysis or processing performed by the server controller 21. The server memory 23 may also store various types of information regarding operations and control of the server 2. The server memory 23 may store a system program, an application program, embedded software, etc. For example, the server memory 23 in the present embodiment includes a schedule DB. The schedule DB contains schedule information for the user U.

A description is given in detail of processing executed in the information processing system S according to the present embodiment.

Figure 4:
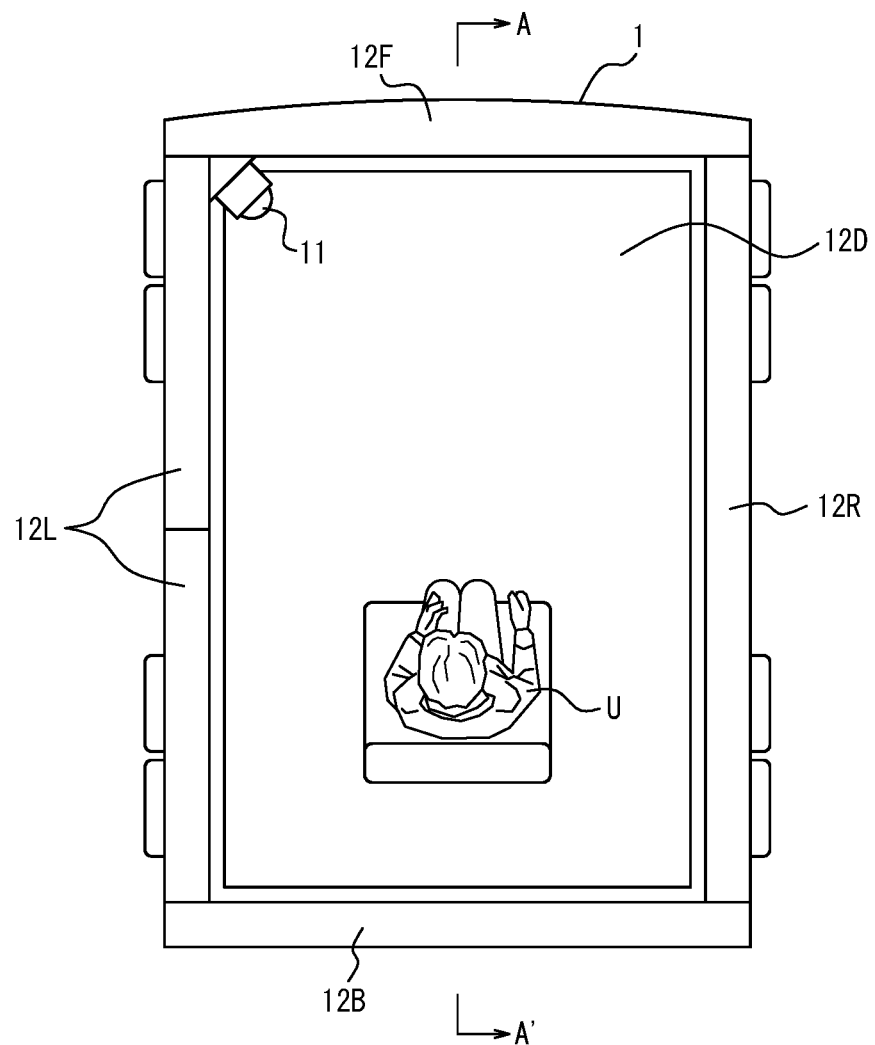
FIG. 4 is a schematic diagram of an interior of the vehicle.

As illustrated in FIG. 4, the display 12 includes a front display portion 12F, a right display portion 12R, a back display portion 12B, a left display portion 12L, and a lower display portion 12D. The front display portion 12F, the right display portion 12R, the back display portion 12B, and the left display portion 12L are mounted in the front direction, the right direction, the back direction, and the left direction in relation to the user U, respectively. The imager 11 is also arranged in at least one location from which an image of the user U can be captured.

Figure 5:
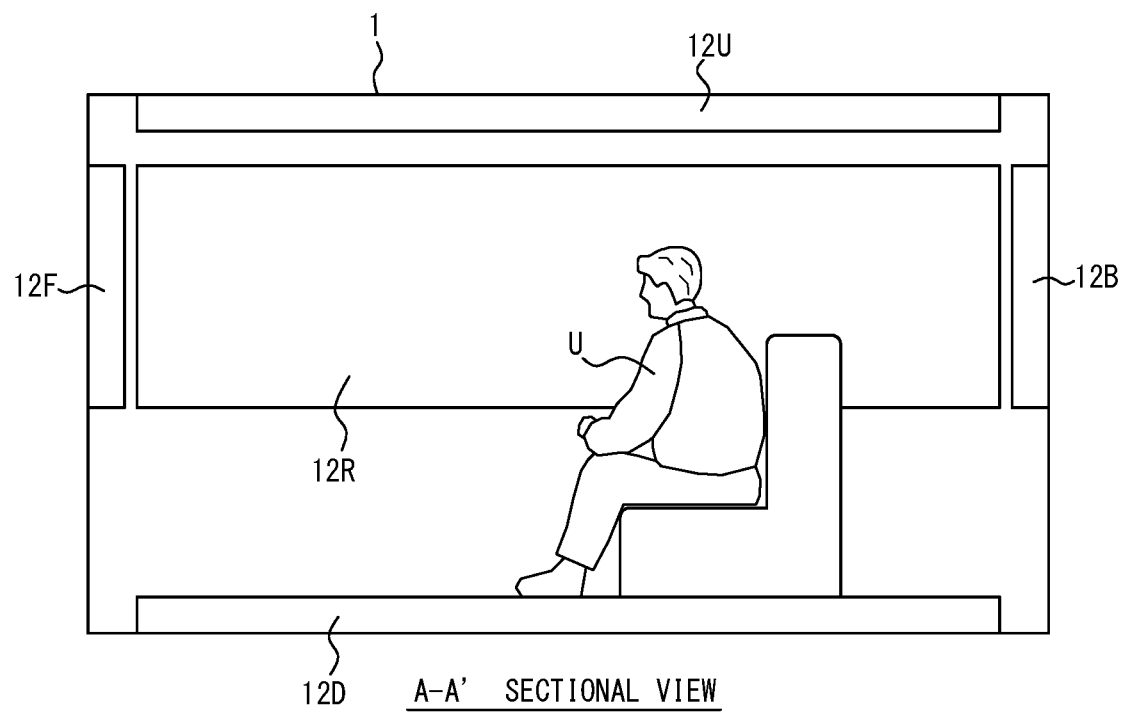
FIG. 5 is an A-A' sectional view of FIG. 4.

FIG. 5 is an A-A' sectional view of FIG. 4. The display 12 further includes an upper display portion 12U. As illustrated in FIG. 5, the upper display portion 12U and the lower display portion 12D are mounted in the up direction (on a ceiling of the vehicle 1) and in the down direction (on a floor of the vehicle 1) in relation to the user U, respectively.

As illustrated in FIGS. 4 and 5, the display 12 is mounted to surround the user U in the vehicle 1. For example, in the present embodiment, as illustrated in FIG. 4, the front display portion 12F, the right display portion 12R, the back display portion 12B, and the left display portion 12L are mounted in a substantially rectangular shape when viewed from above the vehicle 1. However, the configuration of the display 12 to surround the user U is not limited to this. For example, as another embodiment in which the display 12 surrounds the user U, the front display portion 12F, the right display portion 12R, the back display portion 12B, and the left display portion 12L may be mounted in a circular shape, an elliptical shape, a polygonal shape other than the rectangular shape such as a triangular shape, or any closed shape when viewed from above the vehicle 1.

As illustrated in FIG. 4, the front display portion 12F, the right display portion 12R, the back display portion 12B, and the left display portion 12L are mounted in any closed shape. However, as another embodiment in which the display 12 surrounds the user U, the shape formed by the front display portion 12F, the right display portion 12R, the back display portion 12B, and the left display portion 12L may be partially omitted to be an open shape. For example, the back display portion 12B may be omitted. As yet another embodiment in which the display 12 surrounds the user U, less than a predetermined percentage of the shape may be omitted. For example, a half of the front display portion 12F may be omitted in the front display portion 12F, the right display portion 12R, the back display portion 12B, and the left display portion 12L.

As illustrated in FIG. 5, the front display portion 12F and the back display portion 12B according to the present embodiment are mounted in a part of the range from floor height to ceiling height. However, as another embodiment in which the display 12 surrounds the user U, the front display portion 12F and the back display portion 12B may be mounted in the whole range from floor height to ceiling height.

As illustrated in FIG. 5, the upper display portion 12U and the lower display portion 12D according to the present embodiment are mounted on the entire ceiling and on the entire floor, respectively. However, as another embodiment in which the display 12 surrounds the user U, the upper display portion 12U and the lower display portion 12D may be mounted on a predetermined percentage or more of the area of the ceiling and on a predetermined percentage or more of the area of the floor, respectively. As yet another embodiment in which the display 12 surrounds the user U, one or both of the upper display portion 12U and the lower display portion 12D may be omitted.

In the present embodiment, the front display portion 12F, the right display portion 12R, the back display portion 12B, the left display portion 12L, the upper display portion 12U, and the lower display portion 12D present a travel plan as the travel information. However, in another embodiment, the controller 15 may be configured to receive an instruction from the user U to start a videophone call with another user (e.g., a friend, family, or a colleague). The controller 15 may be configured to present an image for the videophone call on the front display portion 12F, the right display portion 12R, the back display portion 12B, the left display portion 12L, the upper display portion 12U, and/or the lower display portion 12D.

Upon detecting that the user U has boarded the vehicle 1, the controller 15 presents, on the display 12, a screen requesting the user U to input attribute information. The attribute information in the present embodiment may include, but is not limited to, age, gender, and hobbies or preferences. Upon receiving attribute information inputs via the input interface 14, the controller 15 stores, in the attribute information DB in the memory 17, the inputted attribute information as illustrated in FIG. 6. Herein, as an example, the inputted attribute information includes "30 years old", "male", and "food" with respect to the age, the gender, and the hobbies or preferences, respectively. In another embodiment, the controller 15 may be configured to identify the user U based on an image of the user U captured by the imager 11 and acquire, from the server 2, attribute information corresponding to the identified user U.

According to the acquired attribute information, the controller 15 is configured to determine a travel plan to be proposed to the user U. Specifically, the controller 15 searches the travel plan DB in the memory 17 for a travel plan including information matching the attribute information. As illustrated in FIG. 7, the travel plan DB stores target ages, target genders, accompanying persons, destinations, purposes, video playback time periods, the presence or absence of digest versions, and control details, in association with travel plan IDs. A description of each information category follows below.

Target age: appropriate age for engaging in the corresponding travel plan.

Target gender: appropriate gender for engaging in the corresponding travel plan.

Accompanying person: an accompanying person during engagement in the corresponding travel plan.

Destination: a destination of the corresponding travel plan.

Purpose: main activities during the corresponding travel.

Video playback time period: a time period for which a standard version of an introductory video associated with the corresponding travel plan is to be played back.

Presence or absence of digest version: the presence or absence of a digest video summarizing the introductory video associated with the corresponding travel plan.

Control details: details (e.g., room temperature, vibration, tilt, or smell) of control of the vehicle 1 executed while a video associated with the corresponding travel plan is played back.

In the above example in which the inputted attribute information includes "30 years old", "male", and "food" with respect to the age, the gender, and the hobbies or preferences, respectively, the controller 15 in the present embodiment extracts Travel Plan P003 from the travel plan DB as a search result.

The controller 15 may be configured to determine which one of the standard and the digest versions of the video is to be played back according to a time period for which the user U is to be on board. For example, the controller 15 acquires, via the network NW, a schedule of the user U from the schedule DB stored in the server memory 23 included in the server 2. As illustrated in FIG. 8, the schedule DB stores dates and times, and events, in association with user IDs. When the current time is 18:55, the controller 15 determines that the next event is a dinner. Upon identifying a dinner venue, the controller 15 calculates a time period for which the user U is to be on board from departure from the current location to arrival at the dinner venue, using any road information. Here, as an example, a case in which the time period for which the user U is to be on board is calculated to be three minutes is described. The controller 15 is configured to compare the calculated time period with the playback time period of the standard version of the video associated with Travel Plan P003. Here, as an example, the playback time period of the standard version of the video is assumed to be 15 minutes. In this case, the controller 15 determines that the time period for which the user U is to be on board is shorter than the playback time period of the standard version of the video. Accordingly, the controller 15 determines to play back the digest version of the video associated with Travel Plan P003.

The controller 15 is configured to play back, on the display 12, the video associated with extracted Travel Plan P003.

Videos to be played back may differ from one portion to another of the display 12. For example, one of the purposes associated with Travel Plan P003 is hiking. Accordingly, the front display portion 12F, the right display portion 12R, the back display portion 12B, the left display portion 12L, the upper display portion 12U, and the lower display portion 12D may acquire from the memory 17 and present scenery images that would be viewed by the user U in the front direction, the right direction, the back direction, the left direction, the up direction, and the down direction, respectively, while the user U is engaging in hiking.

While the video is played back, the controller 15 may control the vehicle 1 according to vehicle control information associated with a travel plan. For example, the controller 15 may regulate room temperature, smell, vibration, or tilt in the vehicle 1 according to the vehicle control information. In the example of Travel Plan P003, "bird song" is associated as the control details. Accordingly, the controller 15 outputs bird song through the output interface 13.

While the display 12 is playing back the video associated with a travel plan, the imager 11 captures an image of the user U. For example, the imager 11 analyzes the captured image to extract feature points of the face or the body of the user U. From the extracted feature points, the imager 11 identifies the expression, the posture, or the like of the user U to determine an interest level of the user U toward the travel plan being presented. Any image analysis techniques, such as machine learning, may be adopted for image analysis.

The controller 15 determines whether the interest level of the user U is greater than a threshold. The threshold can be set to any value. Upon determining that the interest level of the user U is greater than the threshold, the controller 15 determines that the user U is interested in the present travel plan. On the other hand, upon determining that the interest level of the user U is not greater than the threshold, the controller 15 may change the travel plan being presented to a different travel plan. Specifically, the controller 15 acquires, from the travel plan DB in the memory 17, another travel plan including information matching the attribute information acquired from the user U and presents the acquired travel plan on the display 12.

The controller 15 may be configured to control, upon receiving an instruction from the user U, the vehicle 1 to move to a location associated with the travel plan in which the user U is interested. For example, the destination of Travel Plan P003 is Hokkaido. The controller 15 acquires, from the server 2, information on a food fair to be held within a predetermined range from the current location of the user U from among Hokkaido food fairs offering opportunities to experience food as provided in Travel Plan P003. The controller 15 stores, in the travel plan DB, the location at which the food fair is to be held in association with Travel Plan P003. The controller 15 controls the vehicle 1 to move to the location associated with Travel Plan P003.

The controller 15 can accept, via the input interface 14, a user operation at any time to accept a reservation for the travel plan being presented. Specifically, upon accepting a user operation, the controller 15 communicates with the server 2 and finalizes the reservation. Thus, the vehicle 1 is capable of performing everything from proposal of a travel plan to finalization of a reservation.

Additionally, after moving to the location associated with the travel plan that attracts interest, and upon accepting the reservation for the travel plan, the controller 15 may discount the price for the travel plan.

With reference to FIG. 9, a control method executed by the vehicle 1 will be described.

In Step S1, the vehicle 1 acquires attribute information for the user U.

In Step S2, the vehicle 1 determines a travel plan to be proposed to the user U based on the attribute information for the user U.

In Step S3, the vehicle 1 presents the determined travel plan on the display 12. Specifically, the vehicle 1 plays back, on the display 12, a video associated with the travel plan. In this situation, the vehicle 1 may regulate a time period for which the travel plan is to be played back according to a time period for which the user U is to be on board the vehicle 1.

In Step S4, the vehicle 1 controls the vehicle 1 according to vehicle control information associated with the travel plan.

In Step S5, the vehicle 1 captures an image of the user U.

In Step S6, the controller 15 determines an interest level of the user U toward the travel plan based on the captured image and determines whether the interest level is greater than a threshold.

When a determination result is "no" in Step S6, the controller 15 executes Step S2 to extract another travel plan to be proposed to the user U.

When a determination result is "yes" in Step S6, the controller 15 controls, in Step S7, the vehicle 1 to move to a location associated with the travel plan, at which at least part of the travel plan can be experienced.

As has been described, according to the present embodiment, the display 12 is mounted in the vehicle 1 to surround a user U in the vehicle 1. The controller 15 is configured to determine travel information to be proposed to the user U based on attribute information for the user U, and present the determined travel information on the display 12. The above configuration allows the vehicle 1 to provide an effective proposal that creates an immersive sensation to the user U.

Furthermore, according to the present embodiment, the controller 15 is configured to present, on the display 12, one or more scenery images of a destination as the travel information. The above configuration allows the vehicle 1 to further enhance the immersive sensation.

Moreover, according to the present embodiment, the controller 15 is configured to control the vehicle 1 according to vehicle control information associated with the travel information. The above configuration allows the vehicle 1 to enhance the immersive sensation using any other elements (e.g., vibration, sound, or smell), in addition to the images presented on the display 12.

Moreover, according to the present embodiment, the controller 15 is configured to determine, based on the image captured by the imager 11, an interest level of the user U toward the travel information being presented, and, upon determining that the interest level is not greater than a threshold, change the travel information being presented to different travel information. The above configuration allows the vehicle 1 to let the user U find satisfying travel information, thereby helping to improve the satisfaction of the user U.

Furthermore, according to the present embodiment, the controller 15 is configured to control, upon receiving a user instruction, the vehicle 1 to move to a location associated with the travel information, at which at least part of the travel information can be experienced. The above configuration allows the vehicle 1 to assist the user U in finding satisfying travel information through experience.

Furthermore, according to the present embodiment, the controller 15 is configured to regulate a time period for which the travel information is to be presented, according to a time period for which the user U is to be on board the vehicle 1. The above configuration allows the vehicle 1 to avoid a situation in which the user U fails to view the whole video associated with the travel information to the end. Accordingly, the vehicle 1 can accept a travel reservation after having convinced the user U.

Furthermore, according to the present embodiment, the display 12 includes the front display portion 12F, the right display portion 12R, the back display portion 12B, the left display portion 12L, the upper display portion 12U, and the lower display portion 12D. The front display portion 12F, the right display portion 12R, the back display portion 12B, the left display portion 12L, the upper display portion 12U, and the lower display portion 12D are configured to present the scenery images that would be viewed by the user U in the front direction, the right direction, the back direction, the left direction, the up direction, and the down direction, respectively, while the user U is engaging in a trip. The above configuration allows the vehicle 1 to provide an effective proposal that creates an immersive sensation.

While the present disclosure has been described based on the drawings and examples, it should be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined together or divided.

For example, in the above-described embodiments, the entirety or part of the functions or processing described as those of the vehicle 1 or the server 2 may be realized as the functions or processing of a general-purpose information processing apparatus, such as a smartphone or a computer. Specifically, a program describing processing details for realizing the functions of the vehicle 1 or the server 2 according to the embodiments may be stored in a memory of such an information processing apparatus, and the program may be read and executed by a processor of the information processing apparatus. Thus, the present disclosure may also be implemented as a program that can be executed by a processor.

The invention claimed is:

1. A vehicle comprising:
a controller; and
a display, wherein
the display is mounted in the vehicle to surround a user in the vehicle, and
the controller is configured to determine travel information to be proposed to the user based on attribute information for the user, and present the determined travel information on the display,
wherein the controller is configured to control the vehicle according to vehicle control information associated with the travel information,
wherein the controller is configured to present, on the display, one or more scenery images of a destination as the travel information,
wherein the display includes a front display portion, a right display portion, a back display portion, a left display portion, a lower display portion, and an upper display portion,
wherein the front display portion, the right display portion, the back display portion, the left display portion, the lower display portion, and the upper display portion are configured to present the scenery images that would be viewed by the user in a front direction, a right direction, a back direction, a left direction, a down direction, and an up direction, respectively, while the user is engaging in a trip,
wherein controlling the vehicle according to the vehicle control information comprises regulating a room temperature in the vehicle,
wherein the controller is configured to control, upon receiving a user instruction, the vehicle to move to a location associated with the travel information, at which food fairs offering an opportunity to experience food associated with the travel information are held,
wherein the controller is configured to present an image for a videophone call on the display, and
wherein the controller is configured to:
(i) acquire a schedule of the user from a memory,
(ii) calculate, based on the schedule, a time period for which the user is to be on board from departure from a current location to arrival at a destination using road information,
(iii) compare the calculated time period with a playback time period of a standard version of a video associated with the travel information,
(iv) upon determining that the time period for which the user is to be on board is shorter than the playback time period of the standard version of the video, determine to play back a digest version of the video associated with the travel information.

2. The vehicle according to claim 1, further comprising a camera, wherein
the camera is configured to capture an image of the user, and
the controller is configured to determine, based on the captured image, an interest level of the user toward the travel information being presented, and, upon determining that the interest level is not greater than a threshold, change the travel information being presented to different travel information.

3. The vehicle according to claim 1, wherein
the controller is configured to regulate a time period for which the travel information is to be presented, according to the time period for which the user is to be on board the vehicle.

4. An information processing system comprising:
the vehicle according to claim 1; and
a server communicably connected to the vehicle via a network.

5. A non-transitory computer readable medium storing a program configured to cause a computer in a vehicle to execute operations, the vehicle including a display mounted in the vehicle to surround a user in the vehicle, the operations comprising:

determining travel information to be proposed to the user based on attribute information for the user;

presenting the determined travel information on the display, the presenting including presenting, on the display, one or more scenery images of a destination as the travel information; and controlling the vehicle according to vehicle control information associated with the travel information, wherein the display includes a front display portion, a right display portion, a back display portion, a left display portion, a lower display portion, and an upper display portion, wherein presenting is performed such that the front display portion, the right display portion, the back display portion, the left display portion, the lower display portion, and the upper display portion present the scenery images that would be viewed by the user in a front direction, a right direction, a back direction, a left direction, a down direction, and an up direction, respectively, while the user is engaging in a trip, wherein controlling the vehicle according to the vehicle control information comprises regulating a room temperature in the vehicle, wherein the computer is configured to control, upon receiving a user instruction, the vehicle to move to a location associated with the travel information, at which food fairs offering an opportunity to experience food associated with the travel information are held, wherein the computer is configured to present an image for a videophone call on the display, and wherein the computer is configured to:
(i) acquire a schedule of the user from a memory,
(ii) calculate, based on the schedule, a time period for which the user is to be on board from departure from a current location to arrival at a destination using road information,
(iii) compare the calculated time period with a playback time period of a standard version of a video associated with the travel information,
(iv) upon determining that the time period for which the user is to be on board is shorter than the playback time period of the standard version of the video, determine to play back a digest version of the video associated with the travel information.

6. The non-transitory computer readable medium according to claim 5, the operations further comprising:
capturing an image of the user; and
determining, based on the captured image, an interest level of the user toward the travel information being presented, and, upon determining that the interest level is not greater than a threshold, changing the travel information being presented to different travel information.

7. A control method performed by a vehicle that includes a display mounted in the vehicle to surround a user in the vehicle, the control method comprising:
determining travel information to be proposed to the user based on attribute information for the user;

presenting the determined travel information on the display, the presenting including presenting, on the display, one or more scenery images of a destination as the travel information; and controlling the vehicle according to vehicle control information associated with the travel information, wherein the display includes a front display portion, a right display portion, a back display portion, a left display portion, a lower display portion, and an upper display portion, wherein presenting is performed such that the front display portion, the right display portion, the back display portion, the left display portion, the lower display portion, and the upper display portion present the scenery images that would be viewed by the user in a front direction, a right direction, a back direction, a left direction, a down direction, and an up direction, respectively, while the user is engaging in a trip, wherein controlling the vehicle according to the vehicle control information comprises regulating a room temperature in the vehicle, wherein the vehicle is configured to control, upon receiving a user instruction, the vehicle to move to a location associated with the travel information, at which food fairs offering an opportunity to experience food associated with the travel information are held, wherein the vehicle is configured to present an image for a videophone call on the display, and wherein the vehicle is configured to:
(i) acquire a schedule of the user from a memory,
(ii) calculate, based on the schedule, a time period for which the user is to be on board from departure from a current location to arrival at a destination using road information,
(iii) compare the calculated time period with a playback time period of a standard version of a video associated with the travel information,
(iv) upon determining that the time period for which the user is to be on board is shorter than the playback time period of the standard version of the video, determine to play back a digest version of the video associated with the travel information.

8. The control method according to claim 7, further comprising:
capturing an image of the user; and
determining, based on the captured image, an interest level of the user toward the travel information being presented, and, upon determining that the interest level is not greater than a threshold, changing the travel information being presented to different travel information.

9. The control method according to claim 7, further comprising
regulating a time period for which the travel information is to be presented according to the time period for which the user is to be on board the vehicle.

* * * * *